(12) United States Patent
Potharaju et al.

(10) Patent No.: US 10,908,922 B2
(45) Date of Patent: Feb. 2, 2021

(54) DATAFLOW CONTROLLER TECHNOLOGY FOR DATAFLOW EXECUTION GRAPH

(71) Applicant: Microsoft Technology Licensing, LLC, Redmond, WA (US)

(72) Inventors: Rahul Potharaju, Redmond, WA (US); Terry Yumin Kim, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/045,559

(22) Filed: Jul. 25, 2018

(65) Prior Publication Data
US 2020/0034157 A1    Jan. 30, 2020

(51) Int. Cl.
*G06F 9/445* (2018.01)

(52) U.S. Cl.
CPC .................. *G06F 9/44505* (2013.01)

(58) Field of Classification Search
CPC ... H04L 67/10; H04L 41/0806; H04L 43/026; H04L 47/24; G06F 8/4452; G06F 8/34; G06F 9/44505
See application file for complete search history.

(56) References Cited

U.S. PATENT DOCUMENTS

| | | | | |
|---|---|---|---|---|
| 8,997,107 B2* | 3/2015 | Jain | ............... | G06F 9/46 709/223 |
| 2011/0083046 A1* | 4/2011 | Andrade | ............ | G06F 11/0793 714/47.1 |
| 2013/0007753 A1* | 1/2013 | Jain | ............... | G06F 9/46 718/103 |
| 2014/0108489 A1* | 4/2014 | Glines | ............... | G06F 9/5066 709/201 |
| 2016/0344786 A1* | 11/2016 | Fawcett | ............ | G06F 16/24568 |

OTHER PUBLICATIONS

Janinehang, "Control Flow—SQL Server Integration Services (SSIS) Microsoft Docs", Retrieved From: https://docs.microsoft.com/en-us/sql/integration-services/control-flow/control-flow?view=sql-server-ver15, Mar. 14, 2017, 3 Pages.
Janinezhang, "Data Flow—SQL Server Integration Services (SSIS) Microsoft Docs", Retrieved From: https://docs.microsoft.com/en-us/sqllinteg ration-services/control-flow/data-flow-task?view=sql-server-ver15, Mar. 14, 2017, 10 Pages.
"International Search Report and Written Opinion Issued in PCT Application No. PCT/US19/038082", dated Sep. 20, 2019, 12 Pages.

* cited by examiner

*Primary Examiner* — S. Sough
*Assistant Examiner* — Cheneca Smith
(74) *Attorney, Agent, or Firm* — Workman Nydegger (57) ABSTRACT

A dataflow controller technology. A dataflow execution graph (such as a directed acyclic graph) receives or is to receive one or more data streams for processing. The control of the dataflow execution graph is performed by a set of one or more dataflow controllers that are dedicated to that dataflow execution graph. Each dataflow execution graph is instantiated and assigned to the dataflow execution graph such that the assignment results in the dataflow controller executing dataflow control functions for that dataflow execution graph. By dedicating controller(s) to only one dataflow execution graph, the risk of failure of the controller is bound to a single dataflow execution graph.

15 Claims, 6 Drawing Sheets

DATAFLOW CONTROLLER TECHNOLOGY FOR DATAFLOW EXECUTION GRAPH

BACKGROUND

Large scale cloud and Internet service providers typically generate millions of events per second. To handle such high event throughput, events are often accumulated, prior to being processed as a batch. More recently, to reduce latency and to ensure timely event processing, stream processing systems avoid batching by processing the events as a stream.

There can be high variability (called herein "temporal variability") in the volume of events that are being streamed with each event stream. For instance, an event stream can include a mix of expected events (e.g., processing needs during the day can be typically higher than at night, and so forth), and unexpected events (e.g., dramatic stock market changes, and so forth). Furthermore, each event stream has different resource requirements due to there being different workload characteristics (called herein "spatial variability") across event streams. Furthermore, in large-scale systems, there are inevitable failures and hardware heterogeneity that make it hard to ensure stable performance in processing event streams. To handle these variabilities and uncertainties, users of stream processing systems (typically system administrators) often provision resources with a safety factor, leaving many resources idle or underutilized.

Many existing stream processing systems adopt a streaming dataflow computational model. In this model, a computational job is represented as a directed acyclic graph (DAG) of operators, which is also called a "dataflow execution graph". Although such operators may be stateless, such operators are most often stateful in that they maintain mutable local state. Each operator sends and/or receives logically timestamped events along directed edges of the DAG. Upon receiving an event along an input edge(s), an operator updates its local state if appropriate, potentially generates new events, and sends those new events to downstream operators along output edge(s). Operators without input edges are termed "source" operators, or simply "sources". Operators without output edges are termed "sink" operators, or simply "sinks". An edge in a DAG has no state but can have configurable properties. For example, a property of an edge might be queue size thresholds that trigger back-pressure.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a dataflow controller technology. A dataflow execution graph (such as a directed acyclic graph) receives or is to receive one or more data streams for processing. The control of the dataflow execution graph is performed by a set of one or more dataflow controllers that are dedicated to that dataflow execution graph. Each dataflow execution graph is instantiated and assigned to the dataflow execution graph such that the assignment results in the dataflow controller executing dataflow control functions for that dataflow execution graph.

By dedicating controller(s) to only one dataflow execution graph, the risk of failure of the controller is bound to a single dataflow execution graph. Thus, if a dataflow controller fails, there is only one dataflow execution graph impacted. The concept may be implemented in an environment in which there are multiple dataflow execution graphs, in which there may be one set of dataflow controller(s) for one dataflow execution graph, another set of dataflow controller(s) for another dataflow execution graph, and so forth.

There may be a higher-level controller (or a "multi-dataflow controller") for different sets of dataflow controller(s). This type of control allows execution to be much more resilient to failure of a controller. For instance, a higher-level controller may perform control tasks for multiple dataflow controllers. However, functions that are allocated to the higher-level controller may be less subject to risk of failure (like simply periodically making sure a dataflow controller is running), whereas the dataflow controllers may perform more processing-intensive functions that are more subject to risk of failure, such as migrating a dataflow execution graph from one structure to another in order to perform scale out. Alternatively, or in addition, the higher-level controllers may be redundantly provisioned.

As another example, dataflow controllers may be redundantly assigned to a given dataflow controller. Alternatively, or in addition, a pool of pre-instantiated controllers may be available to be assigned when needed to a particular dataflow execution graph. Should a dataflow controller fail, the pre-instantiated controller may be quickly assigned to the dataflow execution graph. By allocating controllers in this way, failure risk may be more easily managed resulting in higher reliability of control.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Therefore, these drawings depict only example embodiments of the invention and are not therefore to be considered to be limiting of the scope of the invention. With this in mind, example embodiments of the invention will be described and explained with reference to the accompanying drawings in which.

DETAILED DESCRIPTION

At least some embodiments described herein relate to a dataflow controller technology. A dataflow execution graph (such as a directed acyclic graph) receives or is to receive one or more data streams for processing. The control of the dataflow execution graph is performed by a set of one or more dataflow controllers that are dedicated to that dataflow execution graph. Each dataflow execution graph is instantiated and assigned to the dataflow execution graph such that the assignment results in the dataflow controller executing dataflow control functions for that dataflow execution graph. By dedicating controller(s) to only one dataflow execution graph, the risk of failure of the controller is bound to a single dataflow execution graph. Thus, if a dataflow controller fails, there is only one dataflow execution graph impacted.

Figure 1:
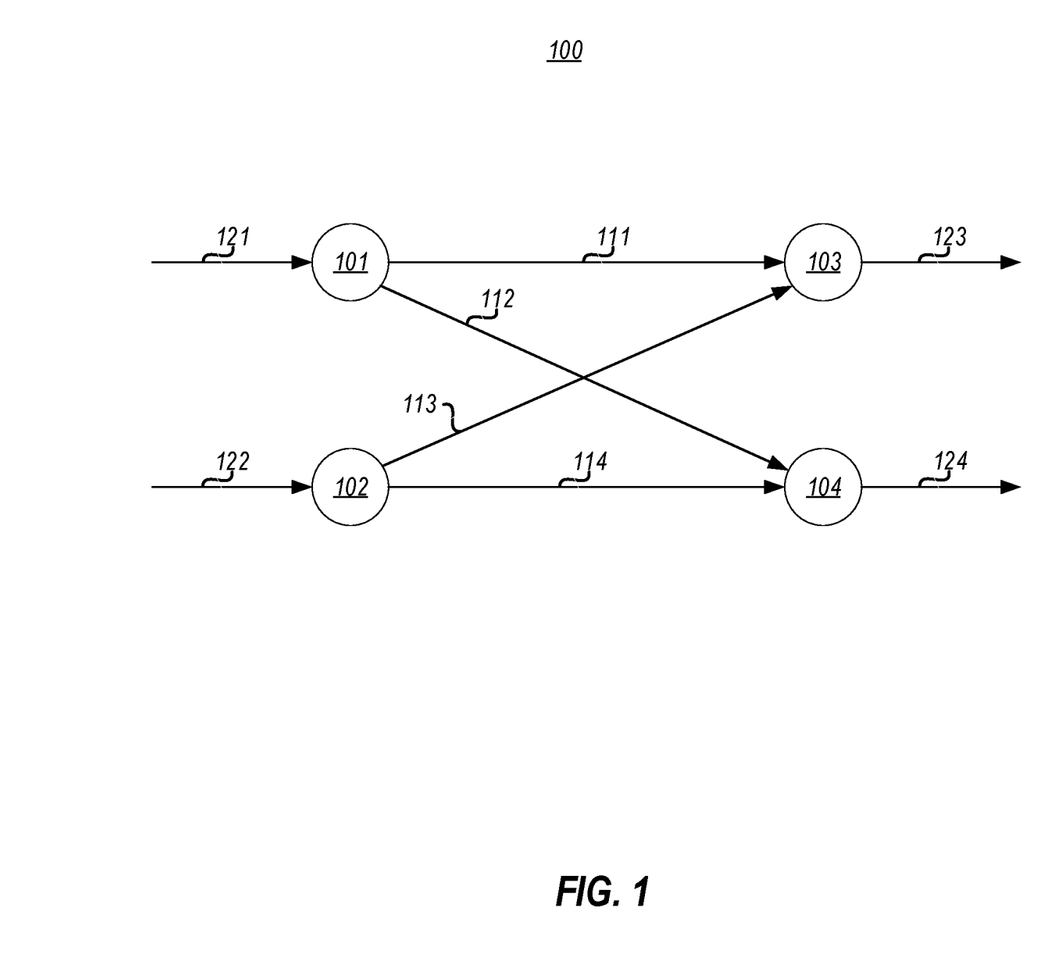
FIG. 1 illustrates an example dataflow execution graph in the form of a directed acyclic graph (DAG) that has multiple operators and edges, and is provided as merely one example of an innumerable variety of dataflow execution graphs.

First, the concept of a dataflow execution graph will be described with respect to FIG. 1. Then, an example environment in which multiple controllers control multiple dataflow execution graphs will be described with respect to FIGS. 2 and 3. The use of a pre-instantiated controller pool that allows for rapid assignment of controllers without environments of FIGS. 2 and 3 will then be described with respect to FIG. 4. Then, a method for configuring control of a dataflow execution graph will be described with respect to the flowchart illustrated in FIG. 5. Finally, because various aspects described herein may be implemented by an executable component of a computing system, a computing system will be described with respect to FIG. 6.

In the streaming dataflow computational model, a computational job is represented as a directed acyclic graph (DAG) of operators, which is also called a dataflow execution graph. Although such operators may be stateless, such operators are often stateful in that they maintain mutable local state. Each operator sends and/or receives logically timestamped data messages along directed edges of the dataflow execution graph. Upon receiving a data message along an input edge, an operator updates its local state if appropriate, potentially generates new data messages, and sends those new data messages to downstream operators along output edge(s).

Operators without input edges are termed "source" operators, or simply "sources". These source operators receive the raw input data messages of the data stream(s). For instance, one or more of the source operators may receive data messages from one data stream, and one or more other of the source operators may receive data messages from another data stream, and so forth. Operators without output edges are termed "sink" operators, or simply "sinks". One or more of these sink operators generate the output result of the dataflow execution graph.

A dataflow execution graph may include any number of operators and any number of edges in any configuration. The dataflow execution graph may be as simple as a single operator, with zero edges. On the other hand, the dataflow execution graph may be indescribably complex, having innumerable operators and edges therebetween. FIG. 1 illustrates a relatively simple example in the form of a dataflow execution graph 100.

The dataflow execution graph 100 includes four operators 101, 102, 103 and 104, and four directed edges 111, 112, 113 and 114. The directed edges generally are directed rightward. The operators 101 and 102 are source operators, each receiving the input data messages of the data streams. As an example, perhaps source operator 101 receives input data messages from one data stream (as represented by arrow 121), and source operator 102 receives input data messages from another data stream (as represented by arrow 122). The operator 101 performs an operation on the data messages of the input data stream 121 and provides resulting data messages along directed edges 111 and 112 to appropriate respective operators 103 and 104. The operator 102 performs an operation on the data messages of another input data stream 122 and provides resulting data messages along directed edges 113 and 114 to appropriate respective operators 103 and 104. The operators 103 and 104 are sink operators, each providing output (as represented by the arrows 123 and 124) from the dataflow execution graph 100.

Figure 2:
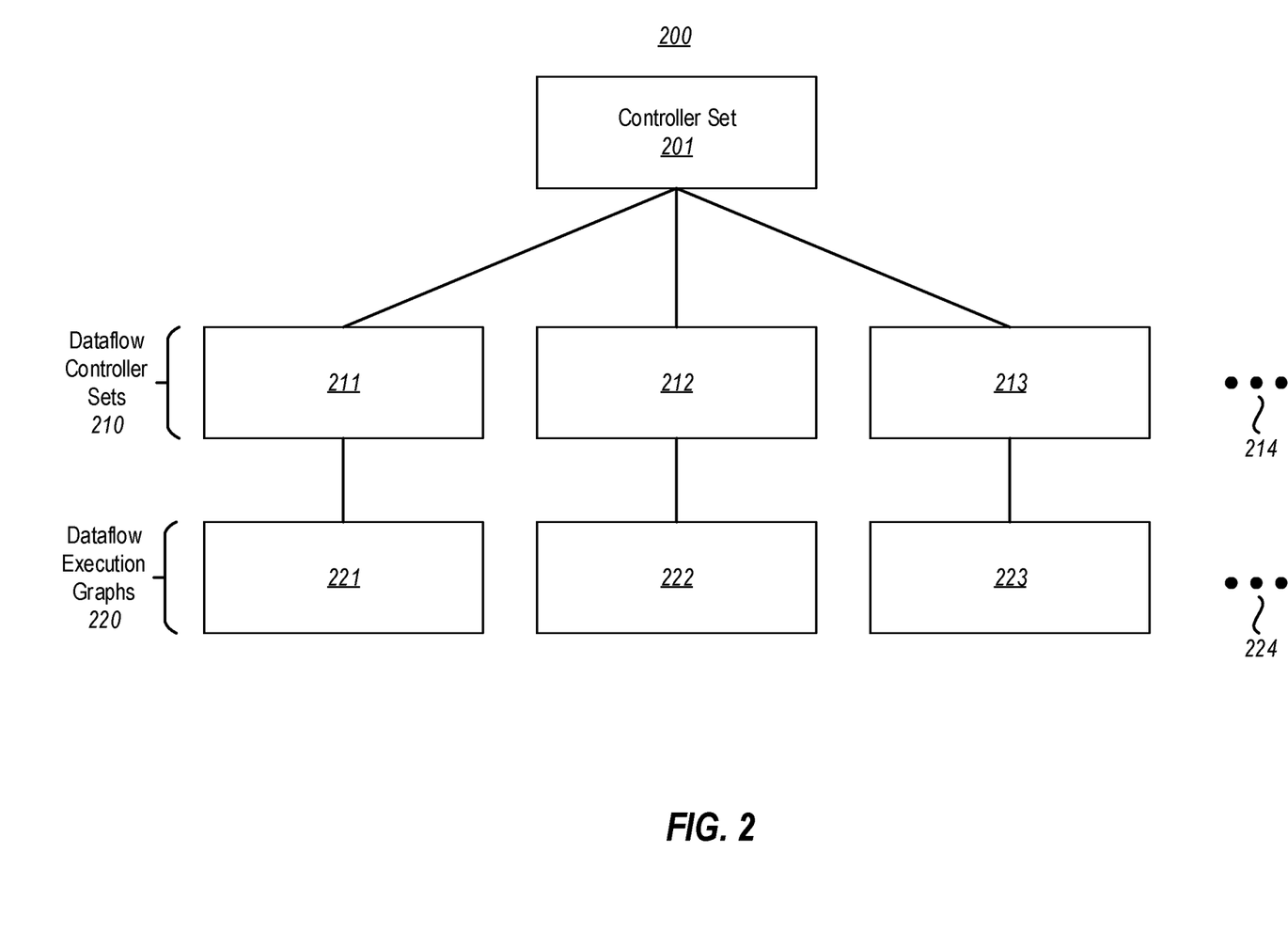
FIG. 2 illustrates an environment in which the principles described herein may be employed, which includes multiple dataflow execution graphs, a dataflow controller set for each of the illustrated dataflow execution graphs, and a multi-dataflow controller set that provide controllers that control across dataflow execution graphs.

Now that dataflow execution graphs have been described, an example environment in which multiple controllers control multiple dataflow execution graphs will be described with respect to FIG. 2. FIG. 2 illustrates an environment 200 in which the principles described herein may be employed. The environment 200 includes any number of dataflow execution graphs 220. In the illustrated embodiment, there are three illustrated dataflow execution graphs 221, 222 and 223. However, the ellipsis 224 represents that the principles described herein are not limited to the number of dataflow execution graphs 220.

The environment 200 also includes dataflow controller sets 210. For instance, in the illustrated case, each of the illustrated dataflow execution graphs has an associated dataflow controller set. In this description, a "dataflow controller" is a controller that is assigned to a particular dataflow execution graph so as to execute control functions for that specific dataflow execution graph. If that dataflow controller was to fail, only control functions for that specific dataflow execution graph would be impacted.

For instance, the first dataflow execution graph 221 has the associated dataflow controller set 211, the second dataflow execution graph 222 has an associated dataflow controller set 212, and the third dataflow execution graph 223 has an associated dataflow controller set 213. However, the ellipsis 214 represents that the principles described herein are not limited to the number of dataflow controller sets 210. The ellipsis 214 also represents that the principles described herein do not require that all of the dataflow execution graphs in the environment 200 have an associated dataflow controller set. Perhaps only some of the dataflow execution graphs 220 in the environment 200 have an associated dataflow controller set. Each dataflow controller set includes one or more dataflow controllers.

The environment 200 also may potentially include a controller set 201 that is not specific to any particular dataflow execution graph. For instance, the controller set 201 may include controllers that control multiple of the dataflow controllers. Such a controller will also be referred to herein as a "multi-dataflow" controller. Each controller of the dataflow controller sets 220 or the controller set 201 may be an executable component (such as the executable component 606 of FIG. 6 described further below) that is executed by a computing system (such as the computing system 600 of FIG. 6 also described further below).

Figure 3:
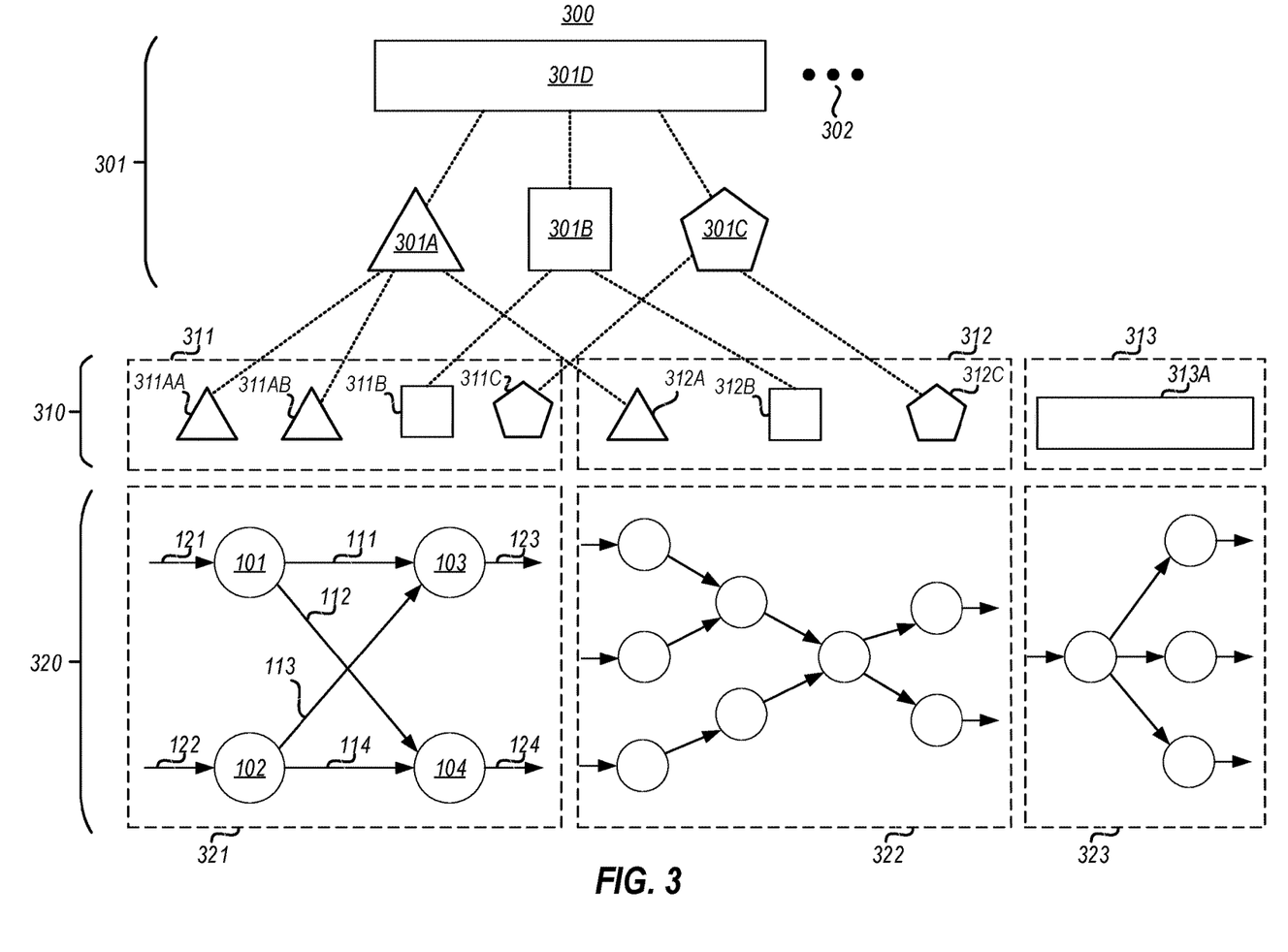
FIG. 3 illustrates a more specific example of the environment of FIG. 2, in which there are specific example dataflow execution graphs shown, particular dataflow controllers shown (including role-based dataflow controllers), and higher-level multi-dataflow controllers illustrated in hierarchical form.

FIG. 3 illustrates an environment 300 that represents an example of the environment 200 of FIG. 2. Here, the dataflow execution graphs 320 of the environment 300 of FIG. 3 are examples of the dataflow execution graphs 220 of the environment 200 of FIG. 2. The first dataflow execution graph 321 of FIG. 3 is an example of the first dataflow execution graph 221 of FIG. 2, and is similar to the dataflow execution graph 100 of FIG. 1. The second dataflow execution graph 322 of FIG. 3 is an example of the second dataflow execution graph 222 of FIG. 2, and is different than the dataflow execution graph 100 of FIG. 1. The third dataflow execution graph 323 of FIG. 3 is an example of the third dataflow execution graph 223 of FIG. 2, and is different than the other two dataflow execution graphs 321 and 322.

In FIG. 3, the dataflow execution graph 321 has an associated dataflow controller set 311, which is an example of the dataflow controller set 211 of FIG. 2. The dataflow controller set 311 has four dataflow controllers 311AA, 311AB, 311B and 311C. The dataflow controller set 311 contains role-based dataflow controllers, where each role is symbolized by the respective controller being represented as a particular shape. For instance, dataflow controllers 311AA and 311AB are triangular which symbolizes that they perform a first role, dataflow controller 311B is square which symbolizes that it performs a second role that is different than the first role, and dataflow controller 301C is a pentagon which symbolizes that it performs a third role that is different than the first and second roles. Examples of different roles that may be performed by a role-based dataflow controller may be 1) monitoring the health of execution of the dataflow execution graph, 2) checkpointing a state of the dataflow execution graph, 3) reconfiguring the dataflow execution graph, and so forth. The reconfiguring may comprise changing an actual structure of the dataflow execution graph.

Note that there are two instances 311AA and 311AB of the dataflow controller that perform the first role within the first dataflow controller set 311. Thus, the dataflow controllers may have redundant copies running at the same time to ensure that if one of the role-based dataflow controllers 311AA or 311AB fails, there is another role-based dataflow controller 311AA or 311AB that can continue performing the role. This may be beneficial where the role is particularly critical or sensitive to downtime.

The dataflow controller set 312 has three dataflow controllers 312A, 312B and 312C. The dataflow controllers of the dataflow controller set 312 are also role-based controllers with dataflow controller 312A performing the first role (as symbolized by its shape being a triangle), dataflow controller 312B performing the second role (as symbolized by its shape being a square), and dataflow controller 312C performing the third role (as symbolized by its shape being a pentagon).

The dataflow controller set 313 has a single dataflow controller 313A. This dataflow controller 313A is not role-based, but performs more comprehensive control of its corresponding dataflow execution graph 323. Thus, FIG. 3 is provided as an example to illustrate the principle that the dataflow controller set for any given dataflow execution graph may be as few as a single dataflow controller, or may include many dataflow controllers. Furthermore, FIG. 3 is provided to demonstrate that the dataflow controllers may perform certain roles only, or may be more generalized controllers. Also, FIG. 3 is provided to show that the dataflow controllers may be redundantly provided so as to continue proper control if a dataflow controller fails.

In FIG. 3, the environment 300 also includes a multi-dataflow controller set 301, which is an example of the controller set 201 of FIG. 2. The multi-dataflow controller set 301 is illustrated as including four multi-dataflow controllers 301A, 301B, 301C and 301D. However, the ellipses 302 represent that the multi-dataflow controller set 301 may include any number of controllers. The multi-dataflow controller set 301 includes three multi-dataflow controllers 301A, 301B and 301C that are role-based and supervise control of dataflow controllers of a particular role. The multi-dataflow controller set 301 also includes a multi-dataflow controller 301D that performs more supervisory functions of a general nature. The ellipsis 302 also represents that the multi-dataflow controller set 301 is not limited to the number (if any at all) of role-based or general controllers, nor to how such controllers are hierarchically structured, if hierarchically structured at all.

In the illustrated example of FIG. 3, the multi-dataflow controller set 301 includes a role-based multi-dataflow controller 301A that controls operation of the dataflow controllers 311AA, 311AB and 312A that perform the first role. The multi-dataflow controller set 301 also includes a role-based multi-dataflow controller 301B that controls operation of the dataflow controllers 311B and 312B that perform the second role, and a role-based multi-dataflow controller 301C that controls operation of the dataflow controllers 311C and 312C that perform the third role.

The multi-dataflow controller set 301 also includes a controller 301D that controls operation of several of the other multi-dataflow controllers 301A, 301B, and 301C, as well as one of the dataflow controllers 313A. Thus, although FIG. 3 is provided by way of example only, FIG. 3 is used to show that there may be one or more multi-dataflow controllers that control the dataflow controllers, and that the multi-dataflow controllers may be hierarchically structured such that a multi-dataflow controller may control some of the dataflow controllers via one or more intermediate-level controllers.

The ellipses 302 also symbolizes that any of the multi-dataflow controllers may have a redundant copy of itself so as to prevent failure of control should that controller fail.

The principles described herein allow risk of controller failure to be carefully managed, thereby providing a control plane that is robust to failure. By dedicating dataflow controller(s) to only one dataflow execution graph, the risk of failure of the dataflow controller is bound to a single dataflow execution graph. Thus, if a dataflow controller fails, there is only one dataflow execution graph impacted. However, robustness against failure may be accomplished in other ways also using the principles described herein.

For instance, functions that are allocated to the higher-level controller may be less subject to risk of failure (like simply monitoring the health of the dataflow controllers or even just making sure the dataflow controllers are still running), whereas the dataflow controllers may perform more processing-intensive functions that are more subject to risk of failure, such as migrating a dataflow execution graph from one structure to another in order to perform scale out. Alternatively, or in addition, the higher-level controllers may be redundantly provided. As another example, dataflow controllers may be redundantly assigned to a given dataflow controller.

Figure 4:
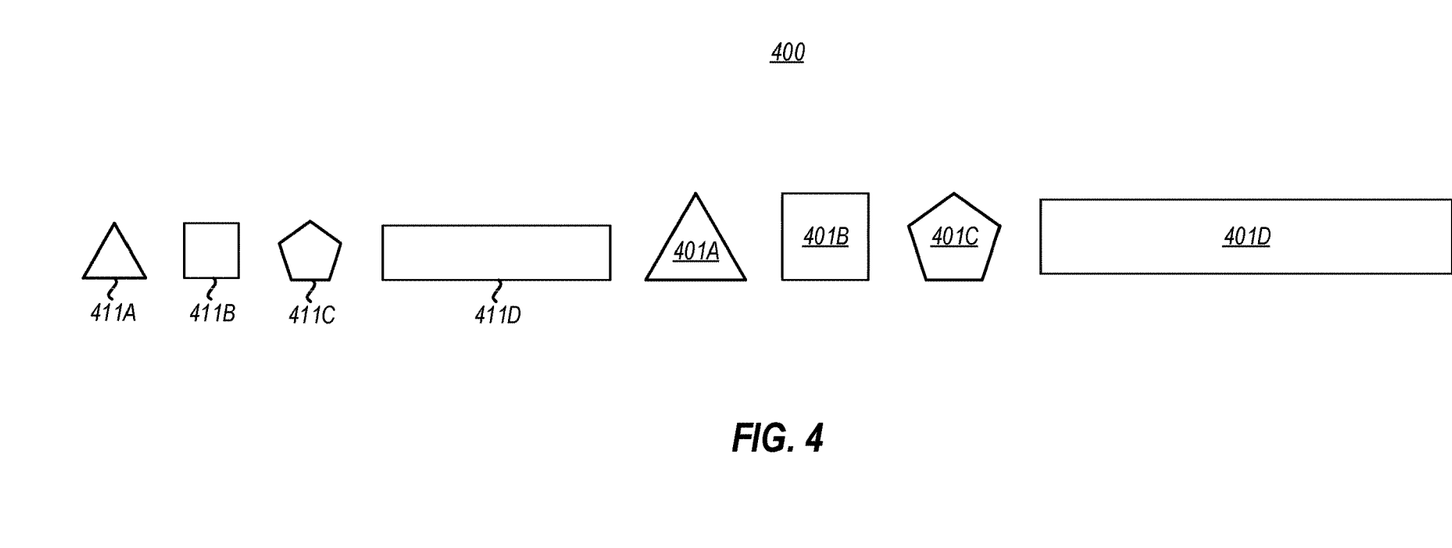
FIG. 4 illustrates a pool of pre-instantiated controllers that may be used to supplement the controllers of FIGS. 2 and 3.

One additional example for protection against failure is illustrated in FIG. 4, which shows a pool of pre-instantiated controllers that may be assigned when needed to satisfy a particular controller deficiency in the environments 200 and 300. For instance, FIG. 4 illustrates a controller pool 400 that includes spare role-based dataflow controllers 411A, 411B and 411C, spare general dataflow controller 411D, spare role-based multi-dataflow controllers 401A, 401B and 401C, and a spare general multi-dataflow controller 401D. By having these controllers pre-instantiated, they need not be instantiated prior to being imported into the working environment. Thus, downtime and loss of redundancy due to a controller failure may be more quickly addressed.

Figure 5:
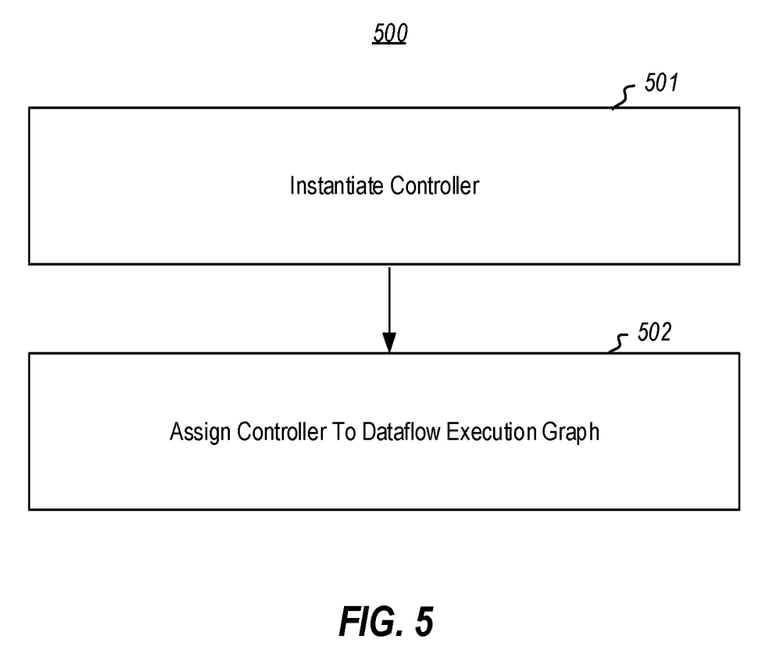
FIG. 5 illustrates a flowchart of a method for configuring control of a dataflow execution graph in accordance with the principles described herein.

FIG. 5 illustrates a flowchart of a method for configuring control of a dataflow execution graph in accordance with the principles described herein. The dataflow controller is first instantiated (act 501). This instantiation may occur well in advance, as when populating the controller pool 400 of FIG. 4. Alternatively, new controllers may be instantiated only after a deficiency in controllers is discovered within the environment 200 or 300.

Then, since the controller is a dataflow controller, that dataflow controller is assigned to a dataflow execution graph (act 502). For instance, in FIG. 2, any of the dataflow controllers in the dataflow controller set 211 would be assigned to the dataflow execution graph 221, any of the dataflow controllers in the dataflow controller set 212 would be assigned to the dataflow execution graph 222, and any of the dataflow controllers in the dataflow controller set 213 would be assigned to the dataflow execution graph 223. Likewise, in FIG. 3, any of the dataflow controllers in the dataflow controller set 311 would be assigned to the dataflow execution graph 321, any of the dataflow controllers in the dataflow controller set 312 would be assigned to the dataflow execution graph 322, and any of the dataflow controllers in the dataflow controller set 313 would be assigned to the dataflow execution graph 323. The method 500 of FIG. 5 may be performed multiple times for each dataflow execution graph, and for each of multiple dataflows.

Because the principles described herein operate in the context of a computing system, a computing system will be described with respect to FIG. 6. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
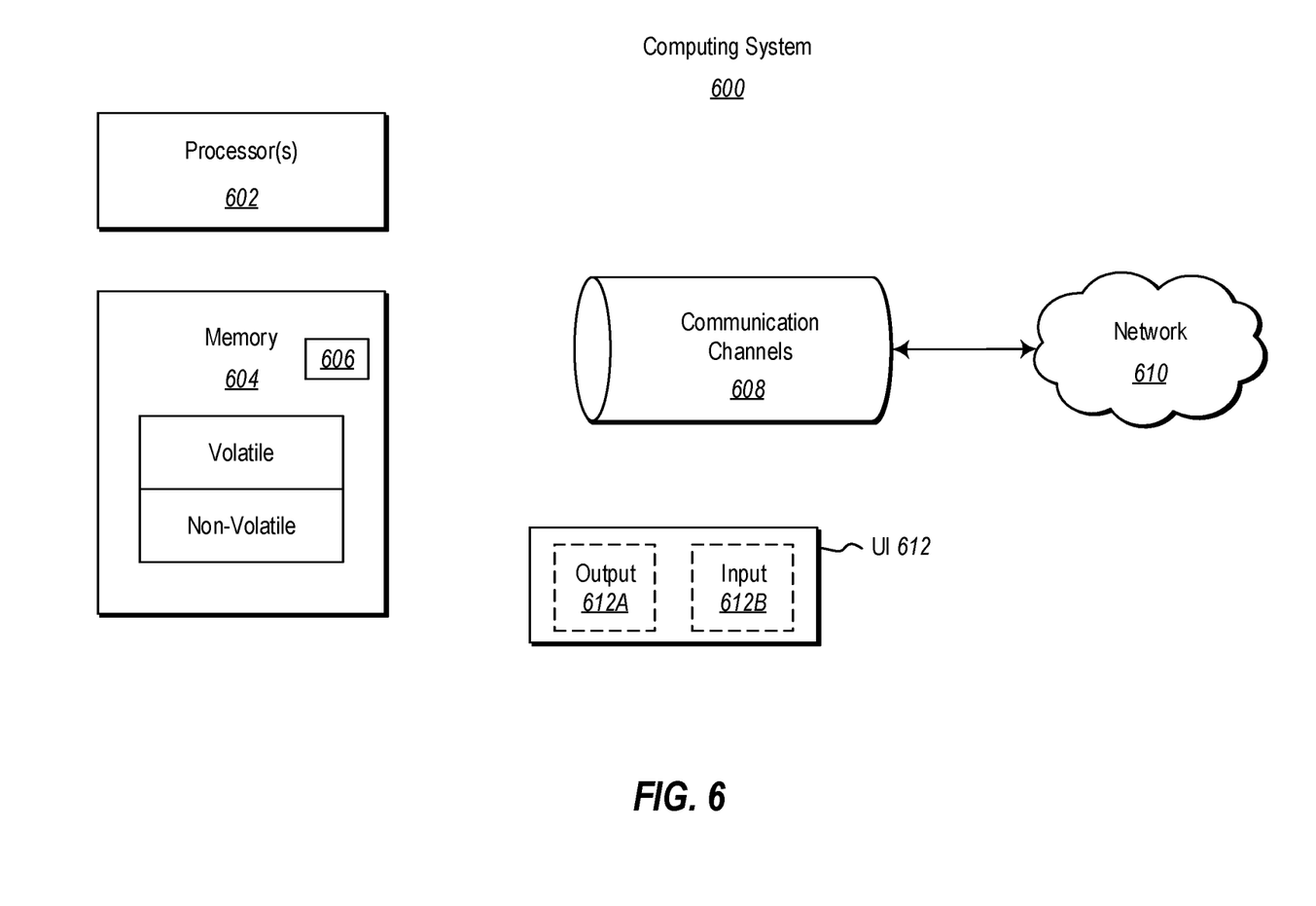
FIG. 6 illustrates an example computer system in which the principles described herein may be employed.

As illustrated in FIG. 6, in its most basic configuration, a computing system 600 typically includes at least one hardware processing unit 602 and memory 604. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 600 has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface 612 for use in interfacing with a user. The user interface 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, holograms, virtual reality, and so forth. Examples of input mechanisms 612B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Accordingly, the principles described herein allow risk of controller failure to be carefully managed, thereby providing a control plane that is robust to failure. By dedicating dataflow controller(s) to only one dataflow execution graph, the risk of failure of the dataflow controller is bound to a single dataflow execution graph. Thus, if a dataflow controller fails, there is only one dataflow execution graph impacted. Additional mechanisms for providing robustness against controller failure have also been described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for configuring control of a plurality of dataflow execution graphs, the method comprising the following:
   instantiating a plurality of role-based dataflow controllers, including for each of the plurality of dataflow execution graphs, instantiating a corresponding set of role-based dataflow controllers that each performs a different type of operation on a corresponding dataflow execution graph, each role-based dataflow controller of the set being configured to perform one of a plurality of roles, and each of the plurality of roles corresponding to a particular type of operation, the particular type of operation comprising at least one of (1) monitoring health of execution of the corresponding dataflow execution graph, (2) checkpointing a state of the corresponding dataflow execution graph, or (3) reconfiguring the corresponding dataflow execution graph;
   assigning each set of the role-based dataflow controllers to a corresponding one of the plurality of dataflow execution graphs, each dataflow execution graph comprising a plurality of operators, and the assignment of each set of the role-based dataflow controllers to the corresponding dataflow execution graph resulting in the corresponding set of the role-based dataflow controllers executing dataflow control over the corresponding plurality of operators of the corresponding dataflow execution graph; and
   for each of the plurality of roles, instantiating at least one multi-dataflow controller to control the role-based dataflow controllers that correspond to a corresponding role.

2. The method in accordance with claim 1, the reconfiguring comprising changing a structure of the at least one dataflow execution graph.

3. The method in accordance with claim 1, the multi-dataflow controller controlling at least two role-based dataflow controllers of multiple sets of the role-based dataflow controllers via at least one intermediate-level dataflow controller.

4. A computing system comprising:
   one or more processors; and
   one or more computer-readable storage media having thereon computer-executable instructions that are structured such that, when executed by the one or more processors, the computing system is caused to control a plurality of dataflow execution graphs, based on performing at least the following:
   instantiating a plurality of role-based dataflow controllers, including for each of the plurality of dataflow execution graphs, instantiating a corresponding set of role-based dataflow controllers that each performs a different type of operation on a corresponding dataflow execution graph, each role-based dataflow controller of the set being configured to perform one of a plurality of roles, and each of the plurality of roles corresponding to a particular type of operation, the particular type of operation comprising at least one of (1) monitoring health of execution of the corresponding dataflow execution graph, (2) checkpointing a state of the corresponding dataflow execution graph, or (3) reconfiguring the corresponding dataflow execution graph;
   assigning each set of the role-based dataflow controllers to a corresponding one of the plurality of dataflow execution graphs, each dataflow execution graph comprising a plurality of operators, and the assignment of each set of the role-based dataflow controllers to the corresponding dataflow execution graph resulting in the corresponding set of the role-based dataflow controllers executing dataflow control over the corresponding plurality of the operators of the corresponding dataflow execution graph; and
   for each of the plurality of roles, instantiating at least one multi-dataflow controller to control the role-based dataflow controllers that correspond to a corresponding role.

5. The computing system in accordance with claim 4, wherein, for at least one of the plurality of dataflow execution graphs, at least one role-based dataflow controller of the corresponding set of the role-based dataflow controllers performs a role of monitoring a health of execution of the at least one dataflow execution graph.

6. The computing system in accordance with claim 4, wherein, for at least one of the plurality of dataflow execution graphs, at least one role-based dataflow controller of the corresponding set of the role-based dataflow controllers performs a role of checkpointing a state of the at least one dataflow execution graph.

7. The computing system in accordance with claim 4, wherein, for at least one of the plurality of dataflow execution graphs, at least one role-based dataflow controller of the corresponding set of the role-based dataflow controllers performs a role of reconfiguring the at least one dataflow execution graph.

8. The computing system in accordance with claim 7, the reconfiguring comprising changing a structure of the at least one dataflow execution graph.

9. The computing system in accordance with claim 4, the multi-dataflow controller controlling at least two role-based dataflow controllers of multiple sets of the role-based dataflow controllers via at least one intermediate-level dataflow controller.

10. A computer program product comprising one or more computer-readable storage media having thereon computer-executable instructions that are structured such that, when executed by one or more processors of a computing system, cause the computing system to configure control of a plurality of dataflow execution graphs, based on performing at least the following:
    instantiating a plurality of role-based dataflow controllers, including for each of the plurality of dataflow execution graphs, instantiating a corresponding set of role-based dataflow controllers that each performs a different type of operation on a corresponding dataflow execution graph, each role-based dataflow controller of the set being configured to perform one of a plurality of roles, and each of the plurality of roles corresponding to a particular type of operation, the particular type of operation comprising at least one of (1) monitoring health of execution of the corresponding dataflow execution graph, (2) checkpointing a state of the corresponding dataflow execution graph, or (3) reconfiguring the corresponding dataflow execution graph;
    assigning each set of the role-based dataflow controllers to a corresponding one of the plurality of dataflow execution graphs, each dataflow execution graph comprising a plurality of operators, the assignment of each set of the role-based dataflow controllers to the corresponding dataflow execution graph resulting in the corresponding set of the role-based dataflow controllers executing dataflow control over the corresponding plurality of the operators of the corresponding dataflow execution graph; and for each of the plurality of roles, instantiating at least one multi-dataflow controller to control the role-based dataflow controllers that correspond to a corresponding role.

11. The computer program product in accordance with claim 10, wherein, for at least one of the plurality of dataflow execution graphs, at least one role-based dataflow controller of the corresponding set of role-based dataflow controllers performs a role of monitoring a health of execution of the at least one dataflow execution graph.

12. The computer program product in accordance with claim 10, wherein, for at least one of the plurality of dataflow execution graphs, at least one role-based dataflow controller of the corresponding set of role-based dataflow controllers performs a role of checkpointing a state of the at least one dataflow execution graph.

13. The computer program product in accordance with claim 10, wherein, for at least one of the plurality of dataflow execution graphs, at least one role-based dataflow controller of the corresponding set of role-based dataflow controllers performs a role of reconfiguring the at least one dataflow execution graph.

14. The computer program product in accordance with claim 13, the reconfiguring comprising changing a structure of the at least one dataflow execution graph.

15. The computer program product in accordance with claim 10, the multi-dataflow controller controlling at least two of multiple sets of the role-based dataflow controllers via at least one intermediate-level dataflow controller.

* * * * *